United States Patent [19]

Shikada et al.

[11] Patent Number: 5,139,756
[45] Date of Patent: Aug. 18, 1992

[54] CATALYTIC OXIDATION OF AMMONIA

[75] Inventors: Tsutomu Shikada; Minoru Asanuma; Yakudo Tachibana, all of Tokyo, Japan

[73] Assignee: NKK Corporation, Tokyo, Japan

[21] Appl. No.: 825,764

[22] Filed: Jan. 21, 1992

Related U.S. Application Data

[63] Continuation of Ser. No. 592,100, Oct. 3, 1990, abandoned.

[30] Foreign Application Priority Data

Oct. 5, 1989 [JP] Japan .................................. 1-260713

[51] Int. Cl.⁵ .............................................. C01B 21/02
[52] U.S. Cl. ..................................... 423/237; 423/351
[58] Field of Search ................................. 423/237, 351

[56] References Cited

U.S. PATENT DOCUMENTS

| | | | |
|---|---|---|---|
| 2,601,221 | 6/1952 | Rosenblatt et al. | 423/351 |
| 3,304,249 | 2/1967 | Katz | 423/DIG. 16 |
| 3,505,027 | 4/1970 | Breitbach et al. | 423/351 |
| 4,003,978 | 1/1977 | Shiraishi et al. | 423/351 |
| 4,080,426 | 3/1978 | Kittrell et al. | 423/351 |
| 4,081,510 | 3/1978 | Kato et al. | 423/351 |
| 4,101,642 | 7/1978 | Tippmer | 423/237 |
| 4,138,469 | 2/1979 | Kato et al. | 423/351 |

FOREIGN PATENT DOCUMENTS

| | | | |
|---|---|---|---|
| 0310584 | 4/1989 | European Pat. Off. | |
| 2026657 | 1/1972 | Fed. Rep. of Germany | 423/351 |
| 2824534 | 12/1978 | Fed. Rep. of Germany | |
| 2189320 | 1/1974 | France | |
| 2327814 | 5/1977 | France | |
| 43767 | 4/1977 | Japan | 423/237 |
| 58067 | 5/1977 | Japan | 423/351 |
| 71373 | 6/1977 | Japan | 423/351 |
| 55472 | 5/1978 | Japan | 423/237 |
| 138237 | 10/1961 | U.S.S.R. | 423/237 |
| 2009120 | 6/1979 | United Kingdom | |

Primary Examiner—Wayne Langel
Attorney, Agent, or Firm—Sughrue, Mion, Zinn, Macpeak & Seas

[57] ABSTRACT

A process for decomposing ammonia recovered from coke oven gas through catalytic oxidation in the presence of oxygen gas, which comprises contacting a catalyst containing at least copper oxide or vanadium oxide in a fluidized state with the ammonia vapor. In the process of the invention, the reaction can be conducted at a low temperature of 400° to 600° C. and the generation of $NO_x$ is very small in quantity.

4 Claims, 1 Drawing Sheet

5,139,756

CATALYTIC OXIDATION OF AMMONIA

This is a continuation of application Ser. No. 07/592,100 filed Oct. 3, 1990, abandoned.

BACKGROUND OF THE INVENTION

1. Field of the Invention

This invention relates to a catalytic oxidation process of ammonia, and more particularly, relates to a catalytic oxidation process of ammonia by contacting the ammonia recovered from coke oven gas with a particular catalyst in a fluidized state in the presence of oxygen gas such as contained in air to decompose it to nitrogen gas and water.

2. Description of the Prior Art

The gas generated from coke oven gas contains 6 to 10 g/Nm$^3$ of ammonia. Since the ammonia corrodes piping as well as generating NO$_x$ through the combustion of the coke oven gas, it is necessary to be removed. A conventional method of removing ammonia from coke oven gas (COG) is conducted by washing the COG with dilute sulfuric acid to recover the ammonia as ammonium sulfate. However, the demand of ammonium sulfate for fertilizer has decreased, and the market price greatly lowered. As a result, the profit is remarkably inferior, and the ammonia removing process by the production of ammonium sulfate is now almost worthless in the industrial viewpoint. At present, the ammonium sulfate production process is reduced, and changed to other processes such as the Phosam process to produce highly pure liquid ammonia, the Koppers process to separate ammonia followed by direct combustion or the Carl Still process to burn ammonia in the presence of a catalyst. In the Carl Still process (Aromatics, vol. 29, No. 6, pp 7–12, 1977), ammonia in COG is absorbed by water or aqueous ammonia, and the aqueous ammonia is distilled to evaporate ammonia vapor. The ammonia vapor is burned completely in in combustion furnace for decomposition of ammonia at about 1000° C. together with COG and air in the presence of catalyst. The heat of the exhaust gas of the combustion furnace is recovered, and then discharged to the atmosphere. The conventional processes have the following problems. In the conventional combustion processes, it is necessary to use heat-resistant materials for the reactor. Moreover, in the case of the direct combustion process, it is difficult to inhibit the production of NO$_x$. On the other hand, in the case of the catalytic combustion process, severe conditions are employed compared with usual catalytic reactions, and the catalyst employed is therefore a special heat-resistant catalyst. The concentration of generated NO$_x$ is high, about 50 ppm.

SUMMARY OF THE INVENTION

An object of the invention is to provide a process to treat ammonia capable of inhibiting the generation of NO$_x$ inexpensively and requiring no heat-resistant material for the reactor nor special heat-resistant catalyst.

The present invention provides a process which has achieved the above object. In the process of the invention, ammonia is converted into nitrogen gas and water by contacting a catalyst in the presence of oxygen gas such as in air, and the process is characterized in that the catalyst is copper oxide or vanadium oxide or a mixture thereof supported on a carrier and is used in a fluidized state.

DETAILED DESCRIPTION OF THE INVENTION

Figure 1:
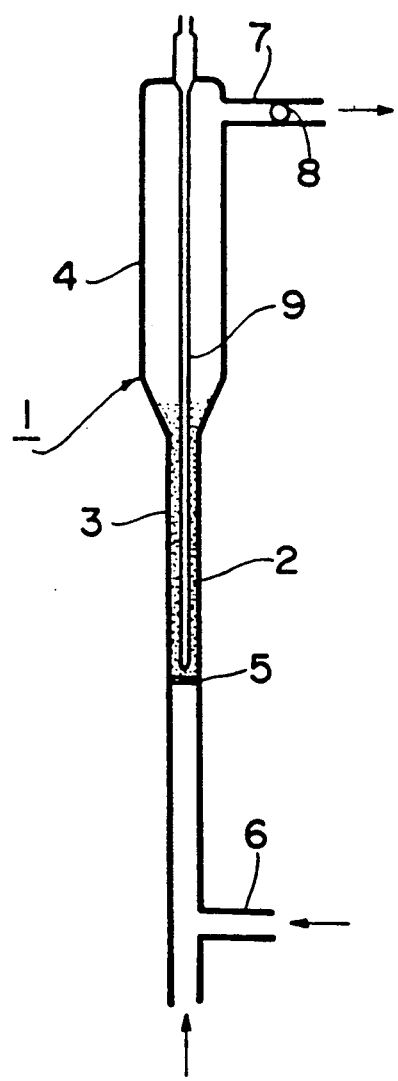
FIG. 1 is a sectional view of an example of the reactor used in the process of the invention.

The fluidized bed catalyst used in the invention is necessary to have a high strength and a great specific surface area, and for that purpose, the catalyst is preferably prepared by supporting the catalytic active component on a carrier having a high strengh and a high specific surface area.

Suitable carriers are alumina, silica gel, silica-alumina and the like, and the alumina on which titania is supported or deposited is preferred.

In the case of the alumina-titania carrier, the alumina used for the production of this carrier may be usual for catalysts, and the rate of titania to alumia is preferably 0.01 to 0.5, more preferably 0.02 to 0.3, by weight. As the method of producing the carrier, graded alumina grains are impregnated in a suitable aqueous titanium salt solution. The titanium salt is enough to be water-soluble, and may be either of a salt of an inorganic acid or a salt of an organic acid. A suitable titanium salt is titanium sulfate. As to the concentration of the titanium salt, about 0.1 to 1.5M is preferred. After the titanium salt solution sufficiently permeates the pores of the alumina, if necessary, the excess solution is removed, and then evaporated to dryness. When the water on the surface of the alumina evaporates, i.e., when the total quantity of the titanium salt solution fills the pores of the alumina, the alumina is contacted with a base solution. The base is capable of reacting with the acid portion forming the titanium salt to produce a water soluble salt, and the base itself is removed in the calcination process by thermal decomposition to volatilize. Preferable bases are ammonia, urea, organic bases and the like, and ammonia is particularly preferred. A suitable concentration of the base is about 0.5 to 3N. By adding the base solution, the titanium solution is hydrolyzed in the pores of alumina, and titanium hydroxide precipitates on the face of the pores. The alumina is washed with water such as purified by ion exchangers to remove base ions and acid ions, and then dried followed by calcining. The calcination may be conducted in the atmosphere, and the calcination temperature is capable of converting titanium hydroxide (Ti(OH)$_4$) into titanium oxide (TiO$_2$) and pyrolyzing the base to volatilize, for example 300° to 600° C.

The catalytic active component is copper oxide or vanadium oxide or a mixture thereof. The copper oxide is CuO, Cu$_2$O or a mixture thereof. The vanadium oxide is V$_2$O$_5$, and may contain V$_2$O$_4$ or the like. The total content of copper oxide and vanadium oxide is preferably 1 to 60 wt. %, more preferably 1 to 30 wt. %.

As the method of supporting copper oxide and vanadium oxide, usual impregnation methods of a soluble salt of each metal can be utilized. That is, in the case of copper oxide, the carrier material is impregnated in an aqueous solution of a water soluble copper salt of which the acid portion is pyrolyzed to volatilize, such as copper nitrate. Similarly, in the case of vanadium oxide, the carrier material is impregnation in an aqueous solution of a vanadate of which the base portion is pyrolyzed to volatilize, such as ammonium vanadate. When both of copper oxide and vanadium oxide are supported on the same carrier, either of them may be first supported, or both of them may be supported simultaneously by using a mixture solution. Besides copper oxide and vanadium oxide, other metal oxides or compounds can be supported.

The catalyst composition prepared as above is dried in air at 90° to 150° C. for 12 to 36 hours, and, if necessary, then calcined according to a conventional method. The calcination is preferably conducted by heating nitrogen gas or air at 350° to 600° C. for 1 to 10 hours.

The catalyst is used in a fluidized bed reactor. The grain size may be varied according to the reaction conditions and the like, and it may be powdered or spherical, crushed or granules having a diameter of millimeters.

The ammonia treated in the process of the invention is recovered from a coke oven. The recovering method may be conventional, and for example, absorption by water, aqueous sulfuric acid solution or aqueous phosphoric acid solution is applicable. The composition of the recovered ammonia vapor is, for example, about 10 to 25% of ammonia, about 2 to 10% of carbon dioxide gas and about 60 to 90% of water vapor.

Oxygen gas is added to the ammonia vapor recovered from COG, and decomposed by catalytic oxidation. When air is used as the oxygen source, a suitable mixing rate of air to the ammonia vapor is so that the concentration ratio of oxygen gas to ammonia ($O_2/NH_3$) of the mixed gas is more than 0.75, preferably 0.75 to 1.5.

As to the reaction conditions, the reaction temperature is usually 400° to 600° C., preferably 500° to 550° C. While the reaction pressure is not restricted, and may be ordinary pressure, increased pressure or reduced pressure, such as in the range of 0.5 to 10 atm can be used.

In the process of the invention, ammonia gas is decomposed by catalytic oxidation to produce $N_2$ and $H_2O$. According to catalytic conditions, a small amount of nitrogen oxide such as $N_2O$ is by-produced. The reaction temperature is low at 400° to 600° C., and the generation of $NO_x$ is extremely small in quantity, due to the use of copper oxide and/or vanadium oxide catalyst. To conduct oxidative decomposition of ammonia in a fluidized bed is advantageous to the fixed bed process in the following points. That is, since the reaction heat generated by the oxidative decomposition of ammonia is dispersed, local heating of the catalyst layer does not occur, and the reaction temperature is easily kept uniform and controlled. Since the contact of the reaction gas with the catalyst efficiently occurs, the oxidative decomposition rate of ammonia is high. Since the reaction proceeds at a low temperature and since the reaction temperature is uniform, the generation of $NO_x$ is inhibited. Moreover, since ammonia concentration can be rendered high, the reactor can be made compact.

EXAMPLES

Example 1

The catalyst was prepared as follows. 150.0 g of 24 wt. % titanium sulfate ($Ti(SO_4)_2$) aqueous solution was dissolved in about 200 ml of water, and 48.0 g of alumina ("DC-2282", Dia Catalyst) graded into 75 to 106 µm in diameter was suspended in the solution. The water content of the suspension was evaporated on a water bath, and the residue was put in about 300 ml of 1 mol./l ammonia aqueous solution. After allowing to stand for about 30 minutes, the alumina was washed until ammonium ion and sulfate ion were not detected. Subsequently, the alumina was dried in air at 120° C. for 24 hours, and then treated at 500° C. for 3 hours in air to obtain a $TiO_2$—$Al_2O_3$ carrier (the ratio by weight of $TiO_2:Al_2O_3$ was 1:9).

47.5 g of the $TiO_2$—$Al_2O_3$ carrier was put in an aqueous solution prepared by dissolving 3.21 g of ammonium metavanadate ($NH_4VO_3$) and 7.0 g of oxalic acid ($(COOH)_2$) in about 300 ml of water, and evaporated to dryness. The residue was dried at 120° C. for 24 hours, and calcined in air at 500° C. for 3 hours. Subsequently, 40 g of the calcined material was put in an aqueous solution prepared by dissolving 6.07 g of copper nitrate ($Cu(NO_3)_2$) in about 300 ml of water, and evaporated to dryness. After drying, the dried material was calcined in air at 500° C. for 3 hours to obtain the object catalyst having a composition such that the ratio by weight of $CuO:V_2O_5:TiO_2:Al_2O_3$ is 5:5:18:72.

The reactor shown in FIG. 1 was used. The reactor 1 was made of silica, and formed cylindrical as a cylinder having two different diameter portions. The lower part was a small diameter portion 3 having an inside diameter of 13 mm in order to increase the fluidity of the catalyst 2 by elevating the flow velocity of gas, while, the upper part was a large diameter portion 4 having an inside diameter of 41 mm in order to prevent the escape of the catalyst by decreasing the flow velocity of gas. The total height was 550 mm, and the height of the large diameter portion 4 containing the enlarging portion was 190 mm. The small diameter portion 3 was divided by the catch basin portion 5 made of a glass filter to prevent dropping of the catalyst located slightly higher than the center, and the height of the part upper to the catch basin portion 5 was 120 mm. A branched pipe 6 was connected to the part lower than the catch basin portion 5. Ammonia vapor was supplied through the lower end opening of the small diameter portion, while, air, etc., were supplied from the branched pipe 6. An exhaust pipe 7 of the reaction gas was connected to the vicinity of the upper end of the large diameter portion 4, and a sampling pipe 8 was connected to the exhaust pipe 7. The upper end of the large diameter portion 4 was closed, and a sheath pipe 9 for inserting a thermocouple for measuring temperature was extended from the center of the closed upper end to the vicinity of the catch basin portion 5.

2.5 ml of the above catalyst and 3.0 ml of the above $TiO_2$—$Al_2O_3$ were put in the above fluidized bed reactor shown in FIG. 1. The ammonia vapor at 80° C. having a composition shown in Table 1 was supplied from the lower end opening of the small diameter portion at a flow velocity of 395 ml/min, and 84 ml/min of oxygen gas at 25° C. and 750 ml/min of helium gas at 25° C. were supplied from the branched pipe 6. After preheating, the reaction was conducted at the reaction temperature of 524° C. under the atmospheric pressure. The space velocity converted into that at ordinary temperature was 28,000 ml/ml.hr.

TABLE 1

| Component | Concentration |
| --- | --- |
| $NH_3$ | 30.0 vol. % |
| $CO_2$ | 10.0 vol. % |
| $H_2O$ | 59.35 vol. % |
| $H_2S$ | 5000 ppm |
| Sulfuric acid mist | 100 ppm |
| Phenols | 1000 ppm |

The reaction products and unreacted materials were analyzed by gas chromatography and a chemiluminescence $NO/NO_x$ meter, and the results are shown in Table 2.

Examples 2 to 5

The reactions were conducted in the method of Example 1 where the reaction temperature and $O_2/NH_3$ ratio were changed.

The results are summarized in Table 2.

Example 6

3 ml of the catalyst prepared in Example 1 was put in the same reactor as employed in Example 1. The same ammonia vapor at 80° C. having a composition shown in Table 1 was supplied from the lower end opening at a flow velocity of 553 ml/min, and 670 ml/min of air at 25° C. was supplied from the branched pipe 6. After preheated, the reaction was conducted at the reaction temperature of 529° C. under the atmospheric pressure. The space velocity converted into that at ordinary temperature was 25,500 ml/ml.hr.

The results are shown in Table 2.

TABLE 2

| Example | $O_2/NH_3$ (Molar Ratio) | Reaction Temperature (°C.) | Conversion of $NH_3$ (%) | $NO_x$ Conc. (ppm) |
|---|---|---|---|---|
| 1 | 0.84 | 524 | 100 | 3 |
| 2 | 0.84 | 502 | 95.4 | 2 |
| 3 | 1.01 | 532 | 100 | 4 |
| 4 | 1.01 | 500 | 88.3 | 1 |
| 5 | 1.09 | 502 | 100 | 34 |
| 6 | 1.00 | 529 | 100 | 2 |

We claim:

1. In a process for decomposing ammonia vapor recovered from coke oven gas through catalytic oxidation in the presence of oxygen gas, the improvement which comprises contacting a catalyst consisting essentially of copper oxide and vanadium oxide supported on a carrier of alumina on which titania is first supported or deposited in a fluidized state with the ammonia vapor, wherein the reaction temperature is 400° to 600° C.

2. The process of claim 1 wherein the ratio by weight of titania to alumina is 0.01 to 0.5.

3. The process of claim 1 wherein said copper oxide is CuO, $Cu_2O$ or a mixture thereof and said vanadium oxide is $V_2O_5$ or a mixture of $V_2O_5$ and $V_2O_4$.

4. The process of claim 1 wherein the reaction pressure is 0.5 to 10 atm.

* * * * *